United States Patent Office 2,774,828
Patented Dec. 18, 1956

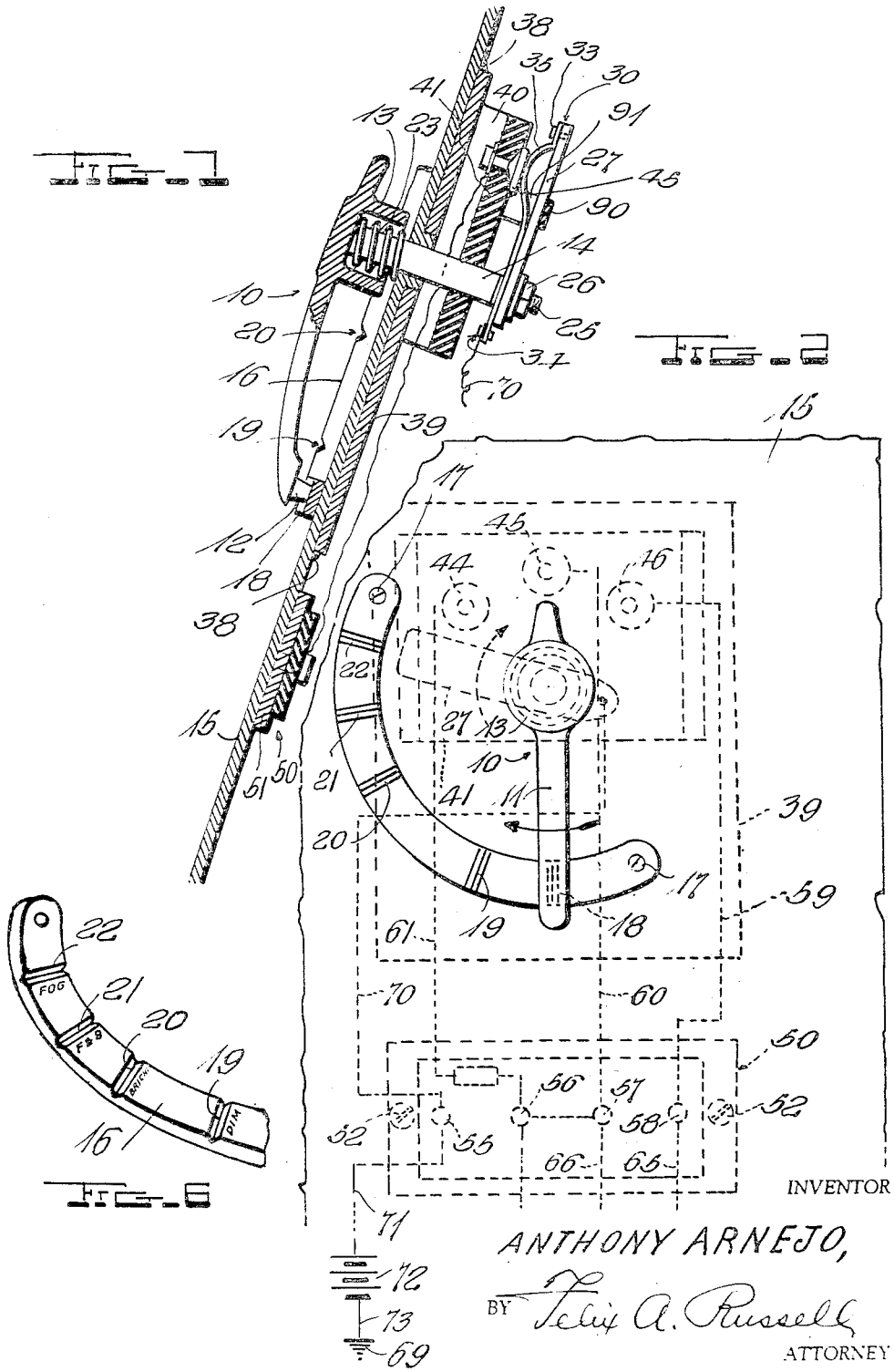

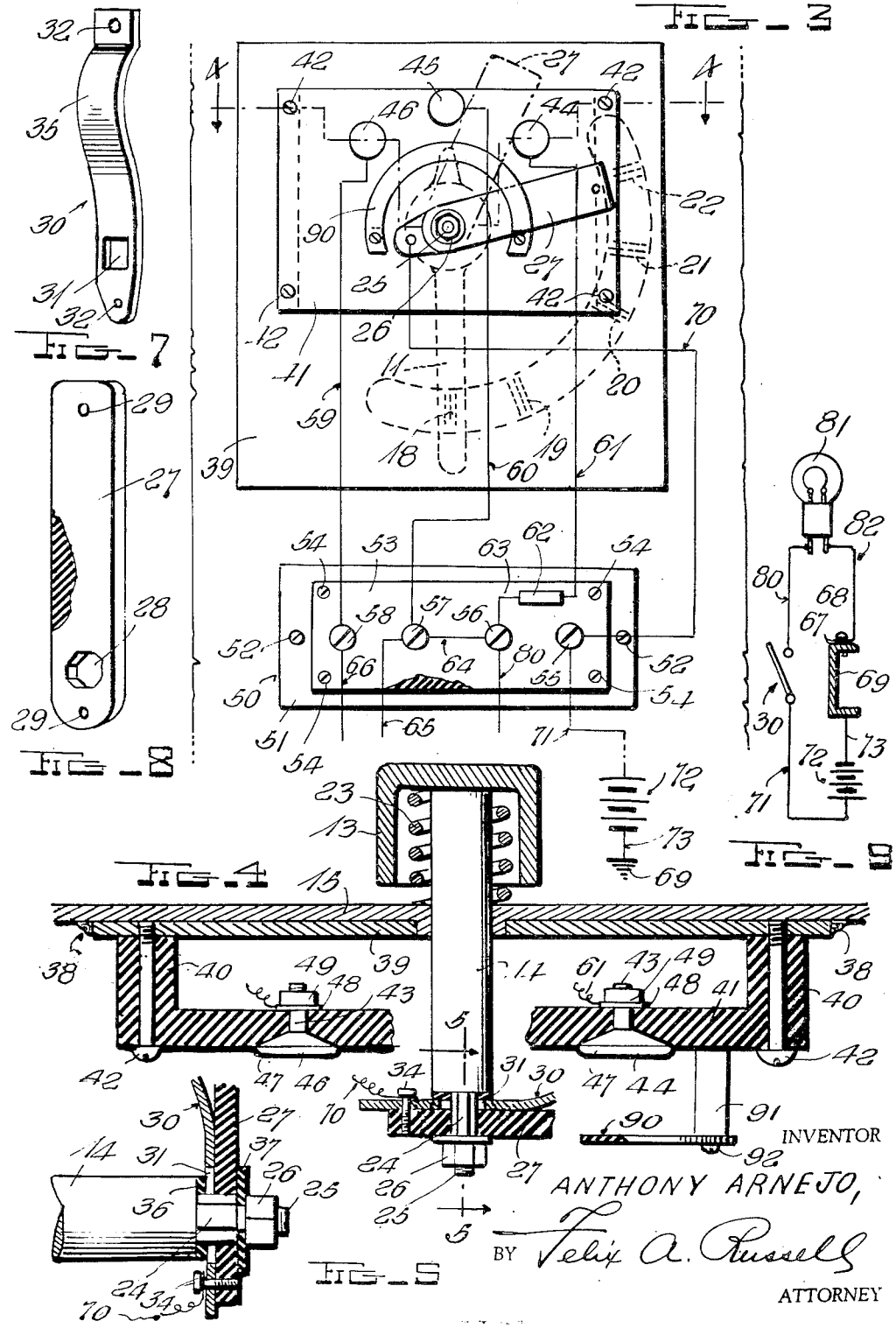

2,774,828

CONTROL SYSTEM FOR AUTOMOBILE HEADLIGHTS

Anthony Arnejo, Detroit, Mich.

Application October 9, 1952, Serial No. 313,939

1 Claim. (Cl. 200—11)

The present invention relates to a control system for automobile headlights and it consists in the combinations, constructions and arrangements of parts herein described and claimed.

Generally there is provided a control system for automobile headlights which, with a single panel-mounted switch, is capable of controlling the bright lights, the dim lights and the fog lights of an automobile. In one of the positions of the switch both the bright lights and the fog lights may be maintained in a lighted condition at the same time. Another and important feature of the invention is the provision of novel means whereby, when the switch is moved from one of its positions to the next, with the exception of the "off" position of such switch for maintaining the one set of lights in a lighted condition until the next set of lights reaches a lighted condition so that there may be no period in between times when all of the lights are unlighted. A novel switch mechanism and a novel wiring panel are provided as parts of the invention and novel means is provided for maintaining the switch handle which forms a part of the invention in any selected position. Other novel features are included as parts of the invention and will be brought out in the annexed specification.

It is accordingly an object of the invention to provide a mechanism of the character set forth which is comparatively simple in construction, inexpensive to manufacture and yet effective and efficient in use.

Another object of the invention is to provide, in a device of the character set forth, novel means for maintaining a switch handle in selected positions.

Another object of the invention is to provide, in a device of the character set forth, novel means for maintaining contact between a fixed contact member and a movable contact member while the movable contact member is being moved to its next contacting position.

Another object of the invention is to provide, in a device of the character set forth, novel means for providing easy access to the various parts of the device forming the invention.

A further object of the invention is to provide, in a device of the character set forth, novel means for maintaining frictional contact between a movable contact member and a plurality of fixed contact members all forming parts of the invention.

Other and further objects of the invention will become apparent from a reading of the following specification taken in conjunction with the drawings, in which:

Figure 1 is a fragmentary vertical sectional view of an embodiment of the invention shown mounted upon the instrument panel of an automobile, Figure 2 is a front elevational view thereof, Figure 3 is a rear elevational view, partly broken away, of the device shown in Figure 1, Figure 4 is an enlarged fragmentary sectional view taken substantially along line 4—4 of Figure 3, Figure 5 is an enlarged fragmentary sectional view taken along line 5—5 of Figure 4, Figure 6 is a fragmentary perspective view of a latch plate forming a part of the invention, Figure 7 is a perspective view of a contact plate forming a part of the invention, Figure 8 is a perspective view, partly broken away, of a contact arm forming a part of the invention, and Figure 9 is a schematic view illustrating the manner of grounding certain wires included as a part of the invention.

Referring more particularly to the drawing, there is shown therein a switch handle generally designated at 10 and having a normally vertically dependent handle portion 11 to the underside of the outer end of which is affixed a latch tooth 12 and which is provided with a hollow hub portion 13 in which is centrally mounted a rearwardly extending metal shaft 14 which extends through and is revolubly mounted in an instrument panel 15 of an automobile. An arcuate latch plate 16 is mounted as by screws 17 upon the instrument panel 15 in concentric relation to the shaft 14 and is provided with a notch 18 adapted to engage the tooth 12 when the handle portion 11 is in its vertically dependent position. This will hereinafter be termed the "off" notch.

The latch plate 16 is provided with four additional notches 19, 20, 21 and 22 which will hereinafter be termed, respectively, the "dim" notch, the "bright" notch, the "bright and fog" notch, and the "fog" notch.

A compression spring 23 surrounds the shaft 14 within the hub 13 and bears against the handle 10 at one of its ends and against the outer face of the panel 15 at its other end. The rearward end of the shaft 14 is provided with a reduced portion 24 which is hexagonal in cross sectional area and with a further reduced portion 25 which is exteriorly threaded for the reception of a nut 26 thereon.

A switch arm 27 of dielectric material is provided with an octagonal opening 28 adjacent one of its ends which opening is adapted to receive therein the octagonal reduced portion 24 of the shaft 14. The arm 27 is provided with a pair of screw-receiving openings 29, one being formed immediately adjacent each end thereof. An elongated contact plate, preferably formed of copper, is generally designated at 30 and is provided with a relatively large opening 31 adjacent one end thereof and with screw-receiving openings 32 immediately adjacent each end thereof whereby the same may be attached to the inner face of the arm 27 by screws 33 and 34, the former being at the outer end of the arm while the latter is at the inner end of the arm. The contact plate 30 is provided with a bulged portion 35 adjacent its outer end. The opening 31 is provided to allow clearance of the contact plate 30 and to maintain the same out of contact with any portion of the shaft 14 when the same is mounted upon the arm 27. It will be apparent that the arm 27 may be mounted in eight positions with relation to the shaft 14 due to the octagonal shape of the portion 24 of the shaft 14 and the octagonal opening 28 of the arm 27.

In assembling the arm 27 and its attached plate 30 upon the shaft 14, a washer 36 of dielectric material is first placed upon the reduced portion 24 prior to placing the arm 27 thereon and a washer 37, likewise of dielectric material, is placed upon the reduced portion 25 after the arm 27 is mounted and prior to placing the nut 26 upon the portion 25.

Affixed as by welding 38 to the rear of the instrument panel 15 is a flat metal panel of generally rectangular shape designated at 39 from the rear face of which extends rearwardly a pair of vertical spaced parallel legs 40 of dielectric material the outer ends of which are integrally interconnected by a board 41 likewise of dielectric material. The board 41 is secured to the metal plate 39 by metal screws 42 which extend therethrough and through opposing ends of the legs 40 to threadably connect with the plate 39.

Extending transversely through the board 41 in spaced circumferential relation to each other and in concentric relation to the shaft 14 are three screws 43 each of which is provided with a contact head 44, 45 and 46, respectively, the outer portion of the board 41 being countersunk to receive the greater portion of each of such heads and the heads having rounded edges, as indicated at 47. Each of the screws 43 is provided at its rearward end with a washer 48 and nut 49.

In Figure 1, the arm 27 is shown in a vertical position for the purposes of illustration only but it will be understood that with the handle 11 in its vertical position, the arm 27 will actually assume the position shown, for example, in full lines in Figure 3 of the drawings.

A wiring panel is generally designated at 50 and consists of a rectangular metal plate 51 which is adapted to be fastened at any convenient location upon the rear of the panel 15 by a pair of screws 52. Surmounting the plate 51 is a plate 53 of dielectric material which is attached to the plate 51 by four screws 54. Four binding posts 55, 56, 57 and 58 are centrally and longitudinally mounted in spaced relation in the panel 53. A wire 59 interconnects that screw 43 having the head 46 with the binding post 58. A wire 60 interconnects that screw having the head 45 with the binding post 57. A wire 61 interconnects that screw having the head 44 with a resistor 62 which is, in turn, connected by a wire 63 to the binding post 56. The posts 56 and 57 are interconnected by a wire 64. Wires 65 and 66 respectively connect the posts 57 and 58 with bright lights and fog lights (not shown) of the automobile in which the present device is installed.

A wire 70 interconnects the lower end of the contact plate 30 by means of the screw 34 with the post 55 which is, in turn, connected by a wire 71 with a battery 72 provided in such automobile. The battery is, in its turn, connected by a wire 73 to ground which in this case will be designated 69, since in all cases in the present invention the chassis 69 will act as the ground for all circuits involved.

In operation, it will be apparent that when the handle portion 11 is in its vertical position that the latch 12 will be engaged in the "off" notch 18 and that at this time the arm 27 will extend at an angle, as shown in full lines in Figure 3 and in dotted lines in Figure 2 where the contact plate 30 will be out of contact with any of the contact heads 44, 45 or 46 as the case may be. When, however, it is desired to light the headlights (not shown) of the vehicle in which the present device is a part, it is only necessary to turn the handle 11 until the latch 12 engages in the "dim" notch 19. This action will move the arm 27 until the contact plate 30 is in direct contact with the head 44. This will complete a circuit through the screw 43 attached to such head 44, thence through the wires 61 to the resistor 62, thence through the wire 63 to the binding post 56. The binding post 56 is connected by a wire 80 to a lamp 81 which is, in turn, connected by a wire 82 to the ground plate 67. In Figure 9 there is illustrated one lamp 81 but it will be understood that the circuits with respect to the wires 80 and 82 and the lamp 81 are identical in other cases in the present invention.

When it is desired to light the headlights to a bright condition, the handle 11 is moved again until it reaches the "bright" notch 20 whereupon the latch 12 will engage therein. This action will move the arm 27 and its contact plate 30 to direct contact with the head 45 which will complete a circuit including the screw 43 attached to the head 45, the wire 60, the post 57 and a wire 65 leading to the bright headlights. The circuit will also include, of course, the plate 30, the wire 70, the post 55, the wire 71, the battery 72 and the wire 73 which is grounded upon the frame or chassis 69 as well as a wire (not shown) but which is the equivalent of the wire 82 leading to the aforesaid bright headlights.

During the passage of the contact plate from the head 44 to the head 45, it will be apparent that the plate 30 and particularly the bulged portion 35 which is adapted to contact the heads 44, 45 and 46, is of sufficient width that as it leaves the contact 44 it will already have come into contact with the head 45 thus maintaining the dim lights in a lighted condition as the bright lights are applied and thus insuring that there will be no darkened period during the operation aforesaid.

When it is desired to place the fog lights of the automobile in operation, it is only necessary to turn the handle 11 until the tooth 12 engages in the "fog" notch 22 at which time the arm 27 and the contact plate 30 will be immediately over the contact head 46 thus completing an electrical circuit including the plate 30, the contact head 46 and its attached screw 43, the wire 49, the post 58, the wire 66 which leads to the fog lamps, the equivalent of the wire 82 which leads to the ground plate 67, the chassis 69, the wire 73, the battery 72, the wire 71, the post 55 and the wire 70.

Should the operator of the vehicle desire to maintain both the bright lights and the fog lights in lighted condition, it is only necessary for him to move the handle 11 until the tooth 12 engages in the "bright and fog" notch 21 at which time the contact plate will be in contact with both the head 45 and the head 46 thus maintaining both of such circuits heretofore described with relation to the heads 45 and 46 in closed condition. It will also be apparent that as the operator moves the contact plate 30 from the head 45 to the head 46 that the bright lights will be maintained in a lighted condition until after the lighted condition of the fog lights has been established. The rounded ends of the contact heads 44, 45 and 46 permit the easy sliding movement of the contact plate 30 thereover as the handle 10 is turned.

There is also provided another feature of the invention which is a semi-circular plate 90 which is formed of a relatively thin plastic material and which is adapted to bear against the outer surface of the arm 27 to maintain the bulged portion 35 of the contact plate 30 in wiping contact with the heads 44, 45 and 46. The plate 90 is mounted upon a pair of posts 91 of dielectric material and the whole affixed to the board 41 by screws 92 extending through the plate 90 and through each of the posts 91 into the board 41.

The applicant herein is the owner of applications Serial No. 310,299, filed September 18, 1952 and Serial No. 311,703, filed September 26, 1952.

While but one form of the invention has been shown and described herein, it will be apparent to those skilled in the art that many minor modifications may be made without departing from the spirit of the invention or the scope of the appended claim.

It will also be apparent that the mechanism covered by the present invention may be applied equally well to the various lights of an airplane or other vehicles containing pluralities of lights of different character.

What is claimed is:

A device of the character described comprising, in combination with an automobile instrument panel, the provision of a switch including a switch board mounted on the rear of said panel, a plurality of fixed contacts mounted on said switch board, a shaft extending through said panel and said switch board, a contact arm radially affixed to one end of said shaft and adapted to selectively contact said fixed contacts, a handle carried at the other end of said shaft, and tension means for maintaining said contact arm in contact with said fixed contacts, said means including a thin arcuate plate of dielectric material, and a pair of posts of dielectric material interconnecting the outer face of said board and the respective end portions of said thin arcuate plate, said contact arm being positioned between said board and said plate and in slidable engagement with said thin arcuate plate.

References Cited in the file of this patent

UNITED STATES PATENTS

| | | |
|---|---|---|
| 854,039 | Jacobson | May 21, 1907 |
| 1,297,768 | Wilson | Mar. 18, 1919 |
| 1,436,212 | Swoboda | Nov. 21, 1922 |
| 1,468,882 | McKee | Sept. 25, 1923 |
| 1,746,626 | Winning | Feb. 11, 1930 |
| 2,122,508 | Bell | July 5, 1938 |